(12) United States Patent
Kimura

(10) Patent No.: US 6,836,281 B2
(45) Date of Patent: Dec. 28, 2004

(54) SCANNING OPTICAL SYSTEM AND IMAGE FORMING APPARATUS USING SAME

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/376,267

(22) Filed: Mar. 3, 2003

(65) Prior Publication Data

US 2003/0174201 A1 Sep. 18, 2003

(30) Foreign Application Priority Data

Mar. 13, 2002 (JP) ........................ 2002-068141

(51) Int. Cl.[7] ................................ B41J 27/00

(52) U.S. Cl. ........................ 347/244; 347/258

(58) Field of Search ................ 347/241, 243, 347/244, 256, 258, 259; 359/575

(56) References Cited

U.S. PATENT DOCUMENTS

| | | | | |
|---|---|---|---|---|
| 6,222,661 B1 | 4/2001 | Takeuchi et al. | ............ | 359/205 |
| 6,487,019 B2 * | 11/2002 | Hoose | ............ | 359/575 |
| 6,603,500 B2 * | 8/2003 | Kato | ............ | 347/258 |
| 2002/0057331 A1 | 5/2002 | Kato | ............ | 347/258 |
| 2002/0179827 A1 | 12/2002 | Kimura | ............ | 250/234 |

FOREIGN PATENT DOCUMENTS

| | | |
|---|---|---|
| JP | 3-70201 B2 | 11/1991 |
| JP | 11-218699 A | 8/1999 |
| JP | 2000-206445 A | 7/2000 |

OTHER PUBLICATIONS

Max Born and Emil Wolf, "Principles of Optics: Electromagnetic Theory of Propagation Interference and Diffraction Light ", vol. III, Tokai University Press, pp. 1026–1033 (with partial translation).

Max Born and Emil Wolf, "Principles of Optics: Electromagnetic Theory of Propagation, Interference and Diffraction of Light", $6^{th}$ Ed., pp. 705–708 (1980).

Grann, E.B., et al., "Artifical uniaxial and biaxial dielectrics with use of two–dimensional subwavelength binary gratings", *J. Opt. Soc. Am. A.*, vol. 11, No. 10, Oct. 1994, pp. 2695–2703.

* cited by examiner

*Primary Examiner*—Hai Pham
(74) *Attorney, Agent, or Firm*—Fitzpatrick, Cella, Harper & Scinto

(57) ABSTRACT

By setting the direction of arrangement of a fine structure grating, it is possible to reduce influence of the structural birefringence of a fine structure grating provided on an optical surface in a scanning optical system to provide a scanning optical system having good optical properties that is not depend on the polarization state of an incident light flux and to provide an image forming apparatus using the same. In the scanning optical system, a light flux emitted from a laser light source 1 is deflected by deflecting device and the light flux having been deflected by the deflecting device is imaged by scanning optical unit 6 onto a surface 7 to be scanned so as to scan the surface to be scanned. The scanning optical unit has at least one optical surface that has a fine structure grating 8 having a grating pitch smaller than the wavelength of the light flux emitted from said laser light source. The direction of arrangement of the fine structure grating is the same all over the surface of the fine structure grating.

5 Claims, 11 Drawing Sheets

SUB-SCANNING DIRECTION

MAIN-SCANNING DIRECTION

SUB-SCANNING DIRECTION

MAIN-SCANNING DIRECTION

US 6,836,281 B2

SCANNING OPTICAL SYSTEM AND IMAGE FORMING APPARATUS USING SAME

BACKGROUND OF THE INVENTION

1. Field of the Invention

The present invention relates to a scanning optical system and an image forming apparatus using the same. Specifically, the present invention relates to a scanning optical system that is adapted to reflect and deflect a light flux emitted from a light source by means of a polygon mirror serving as a light deflector and have an fθ characteristic, which is preferable for use in an image forming apparatus, such as a laser beam printer including an electrophotography process, a digital copying machine or a multi-function printer, which records image information by optically scanning a surface to be scanned through scanning optical means including an optical element provided with a fine structure grating.

2. Related Background Art

In conventional scanning optical systems of laser beam printers etc., a light flux emitted from light source means that has been modulated in accordance with an image signal is cyclically deflected by a deflector composed, for example, of a polygon mirror and converged into a spot on a surface of a photosensitive recording medium by scanning optical means having an fθ characteristic, so that an image is recorded.

FIG. 16 is a cross sectional view taken in the main scanning direction (main scanning cross sectional view) showing the principal portion of a conventional scanning optical system (i.e. optical scanning apparatus).

In FIG. 16, reference numeral 91 designates light source means, which is composed, for example, of a semiconductor laser or the like. Reference numeral 92 designates a collimator lens, which converts a divergent light flux emitted by the light source means into a parallel light flux. Reference numeral 93 designates an aperture stop, which restricts a light flux passing through it to shape the beam. Reference numeral 94 designates a cylindrical lens, which has a certain power only in the sub-scanning direction, to image the light flux having passed through the aperture stop 93 onto a deflection surface (or reflection surface) 95a of a light deflector 95 (which will be described below) as a substantially linear image in a cross section in the sub-scanning direction.

Reference numeral 95 designates a light deflector serving as deflecting means, which is composed, for example, of a polygon mirror (i.e. a rotatory multi-surface mirror) having four faces. The light deflector 95 is rotated in the direction indicated by arrow A in FIG. 16 at a constant speed by driving means (not shown) such as a motor etc.

Reference numeral 96 designates a scanning lens system serving as scanning optical means having a light collecting function and an fθ characteristic, which is composed of first and second scanning lenses (two lenses in all) 96a and 96b. The scanning lens system 96 images a light flux corresponding to image information that has been reflected and deflected by the light deflector 95 onto a surface to be scanned, that is, a surface 97 of a photosensitive drum, while realizing a conjugate relationship between the deflection surface 95a of the light deflector 95 and the photosensitive drum surface 97 in the sub-scanning cross section, to perform a field tilt correcting function in order to correct the surface inclination of the deflection surface 95a.

In FIG. 16, a divergent light flux emitted from the semiconductor laser 91 is converted by the collimator lens 92 into a substantially parallel light flux, and then the light flux is restricted (in light quantity) by the aperture stop 93 and incident on the cylindrical lens 94. The substantially parallel light flux incident on the cylindrical lens 94 emerges from it without any modification with respect to the main scanning cross section. On the other hand, in the sub-scanning cross section, the light flux is converged so as to be imaged onto the reflecting surface 95a of the light deflector 95 as a substantially linear image (namely, a linear image that is longitudinal in the main scanning direction). The light flux reflected and deflected by the reflecting surface 95a of the light deflector 95 is imaged by means of the first and second scanning lenses 96a and 96b onto the photosensitive drum surface 97 as a spot, whereby the imaged light spot scans the photosensitive drum surface 97 in the direction indicated by arrow B (i.e. the main scanning direction) at a constant speed, as the light deflector 95 is rotated in the direction of arrow A. Thus, an image is recorded on the surface 97 of the photosensitive drum as a recording medium.

However, the conventional scanning optical system as described above suffers from the problems as described in the following.

Recently, it has become a general practice to manufacture scanning optical means (i.e. scanning lens systems) of a scanning optical system using a plastic material, which is easy to process into an aspheric shape and with which the manufacturing is easy. However, it is difficult to apply anti-reflection coatings on plastic lenses for technical and economical reasons. So, plastic lenses suffer from Fresnel reflection generated at their optical surfaces.

FIG. 17 is a graph showing incident angle dependency of reflectance and transmittance of an example of an optical element made of a resin, having a refractive index n=1.524, under a condition in which P-polarized light is incident on that element. As will be seen from the graph, the surface reflection at each surface becomes large, as the angle of incidence increases.

In connection with this, since in the scanning optical means, the angle of incidence generally varies as the position of incidence changes away from the on-axis position toward an off-axis position, the Fresnel reflection at each optical surface also varies largely. As a result, there is a difference between the light quantity at the on-axis position and the light quantity at the off-axis position. As the angle of incidence increases from 0 degree to the Brewster's angle, the reflectance decreases (i.e. the transmittance increases), and therefore the transmittance of the whole system increases as the position changes from the on-axis position to an off-axis position. Therefore, the illuminance distribution on the surface to be scanned also increases toward the off-axis position. It will be seen from FIG. 17 that the light quantity at the outermost off-axis position is larger than the light quantity at the on-axis position by 5%. As a result, a density difference would be created in an image output by the image forming apparatus between the central portion and the peripheral portion thereof, which is a problem.

As a solution for the above-mentioned problem, Japanese Patent Application Laid-Open No. 2000-206445 proposes adjusting the diffraction efficiency of a diffraction grating surface provided in scanning optical means appropriately in order to eliminate that problem. Specifically, it proposes adjusting the depths of cuts of diffraction grating surface, on which grating is cut at a predetermined pitch that realizes a desired power distribution for the purpose of correcting chromatic aberration of magnification or correcting focus, to vary the diffraction efficiency of the diffracted light (i.e. the first-order diffracted light) so as to cancel the variation in transmittance created by other refracting surfaces.

However, the diffraction grating proposed by Japanese Patent Application Laid-Open No. 2000-206445 suffers from a problem as described below.

It is known that when the pitch of a grating becomes as small as or smaller than the wavelength of light (i.e. a fine structure grating), it shows a structural birefringence.

In "KOUGAKU-NO-GENRI Vol. III" (a Japanese translation of "Principle of Optics" by Max Born and Emil Wolf), Tokai University Press, p1030, it is describes that regularly arranged particles each of which is made of optically isotropic material and having a size sufficiently larger than its molecule size and smaller than the wavelength of light show a structural birefringence. In other words, a model in the form of an aggregation of thin plane parallel plates having a periodicity equal to or smaller than the order of the wavelength as described in "KOUGAKU-NO-GENRI" becomes a kind of uniaxial crystal whose effective dielectric constant (or permeability), which is obtained based on the dielectric constant of the medium of the plane-plate portion and the dielectric constant of the medium of the non-plane-plate portion, behaves differently for an electric vector parallel to the plane-plates and an electric vector perpendicular to the plane-plates.

More specifically, the fine structure grating that has a grating pitch substantially equal to or smaller than the wavelength of light has different refractive indices with respect to the direction parallel to the direction of the arrangement of the grating and to the direction orthogonal to the direction of the arrangement of the grating, depending on the direction of the plane of polarization of an incident light flux.

Due to the above-described fact, it is impossible to obtain desired transmission and reflection characteristics without setting an appropriate grating pattern in accordance with the polarization of an incident light flux. Japanese Patent Application Laid-Open No. 2000-206445 (U.S. Pat. No. 6,222,661) does not teach this point sufficiently. Particularly, in Japanese Patent Application Laid-Open No. 2000-206445, it is assumed that a concentric grating is used, and so when a beam having a certain image height crosses the grating surface, the direction of grating within the light flux is not constant.

Furthermore, there is such a beam synthesizing system in which two laser light flux having different linear polarization are synthesized by a polarizing beam splitter, reflected and deflected by a light deflector, and then imaged in a scanning manner onto a surface to be scanned by an imaging optical element, which is disclosed, for example, in Japanese Patent Application Laid-Open No. 11-218699. In this type of beam synthesizing system, light fluxes having two polarization states are incident on an imaging optical system. If a fine structure grating having structural birefringence as described above is used in this type of scanning optical system, transmission and reflection characteristics vary depending on the polarization state. Consequently, a difference in light quantity on the image plane will be generated between a plurality of laser light fluxes, and it is impossible to realize uniform exposure, which is a problem.

SUMMARY OF THE INVENTION

An object of the present invention is to reduce influence of the structural birefringence of a fine structure grating provided on an optical surface in a scanning optical system to provide a scanning optical system having good optical properties that is not depend on the polarization state of an incident light flux and to provide an image forming apparatus using the same.

It is another object of the present invention to provide a scanning optical system that can reduce Fresnel (surface) reflection at a lens surface that would cause flare and ghost images and to provide an image forming apparatus using the same.

According to the present invention, there is provided a scanning optical system in which a light flux emitted from a laser light source is deflected by deflecting means and the light flux having been deflected by the deflecting means is imaged by scanning optical means onto a surface to be scanned so as to scan the surface to be scanned, wherein:

the scanning optical means comprises at least one optical surface that has a fine structure grating having a grating pitch smaller than the wavelength of the light flux emitted from said laser light source; and the direction of arrangement of the fine structure grating is the same all over the surface of the fine structure grating.

In this scanning optical system according to the invention, it is preferable that the direction of arrangement of said fine structure grating and the direction of a plane of polarization of an incident light flux have a constant relationship.

In the scanning optical system according to the present invention, the direction of arrangement of said fine structure grating may be either one of a direction parallel to a plane of polarization of an incident light flux, a direction perpendicular to the plane of polarization of the incident light flux or a direction that forms an angle of 45 degrees with the plane of polarization of the incident light flux, or including at least two of these directions.

In the scanning optical system according to the present invention, the direction of arrangement of said fine structure grating may be either one of a direction parallel to a main scanning plane, a direction perpendicular to the main scanning plane or a direction that forms an angle of 45 degrees with the main scanning plane, or including at least two of these directions.

According the invention there is also provided a scanning optical system in which a plurality of light fluxes emitted from a plurality of laser light sources are deflected by deflecting means and the light fluxes having been deflected by the deflecting means are imaged by scanning optical means onto a surface to be scanned so as to scan the surface to be scanned, wherein:

the scanning optical means comprises at least one optical surface that has a fine structure grating having a grating pitch smaller than the wavelength of the light flux emitted from the laser light source; and the directions of polarization of a plurality of light fluxes incident on the fine structure grating are different from each other, and the direction of arrangement of the fine structure grating is arranged to be line symmetrical with respect to composition of vectors representing the directions of polarization of said plurality of light fluxes.

In this scanning optical system according to the invention, the plurality of light fluxes incident on the fine structure grating may be P-polarized light and S-polarized light with respect to a incidence surface of the fine structure grating, and the direction of arrangement of the fine structure grating may be arranged to be line symmetrical with respect to a direction that forms an angle of 45 degree with the incidence surface of the fine structure grating.

According to the present invention there is also provided an image forming apparatus comprising:
- a scanning optical system as described in the foregoing;
- a photosensitive member disposed at the surface to be scanned;
- a developing device that develops an electrostatic latent image formed on the photosensitive member by a scanning light flux from the scanning optical system as a toner image;
- a transferring device that transfers the developed toner image onto a transferring material;
- a fixing device that fixes the transferred toner image on the transferring material;
- a printer controller that converts code data input from an external device into an image signal and input it to the scanning optical system.

DETAILED DESCRIPTION OF THE PREFERRED EMBODIMENT

Embodiment 1

In the following, the first embodiment of the present invention will be described with reference to FIGS. 1 to 5.

Figure 1:
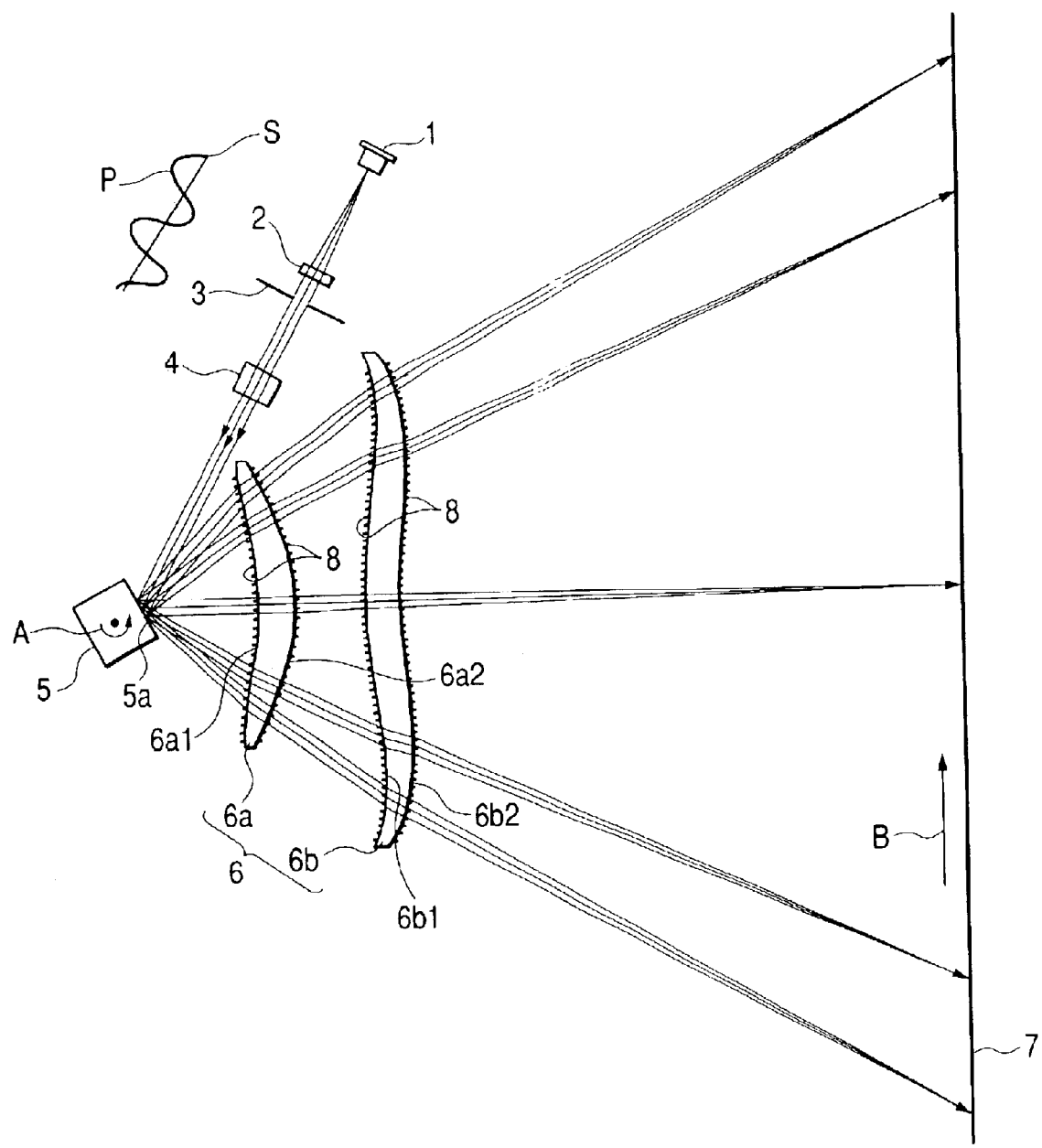
FIG. 1 is a cross sectional view of a first embodiment of the present invention taken at its main scanning plane.
Figure 2:
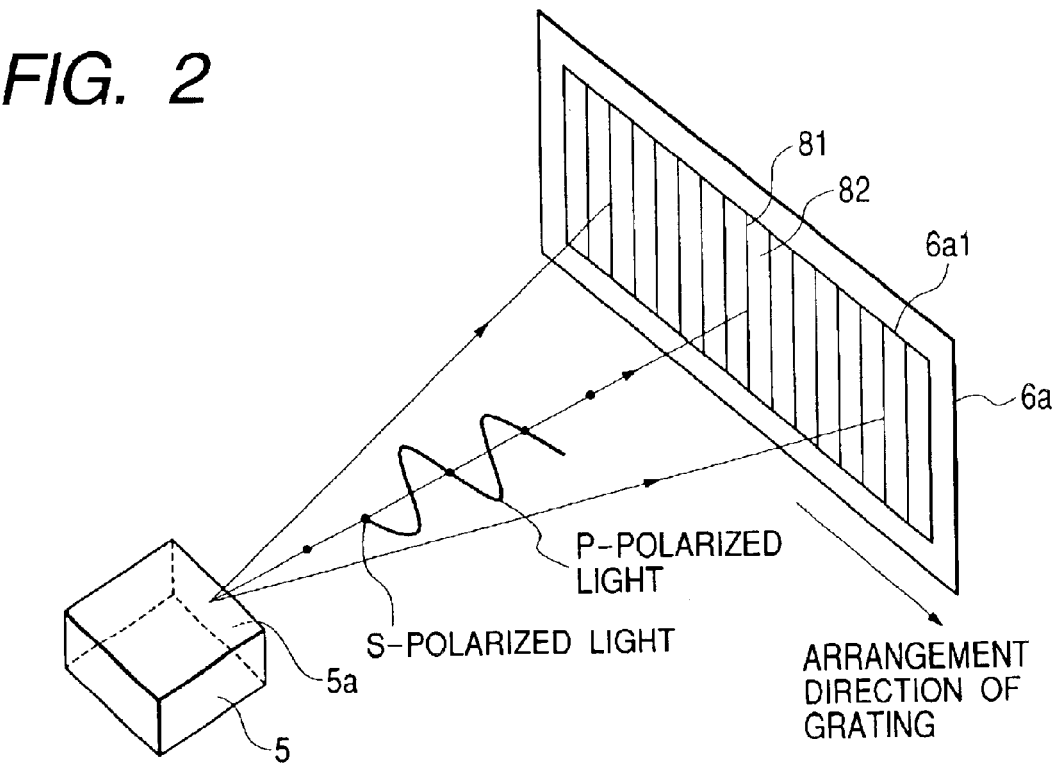
FIG. 2 is a schematic perspective view of the principal portion of the first embodiment of the invention, showing a light flux incident on a fine structure grating.

FIG. 1 is a cross sectional view in the main scanning direction (main scanning cross section) showing the principal portion of a scanning optical system (or optical scanning apparatus) according to the first embodiment of the present invention. FIG. 2 is a schematic perspective view of the principal portion showing a light flux (P-polarized) incident on a fine structure grating, in which grating portions 81 and non-grating portions 82 are illustrated in an exaggerated manner at a larger scale.

In this specification, a main scanning direction is defined as the direction in which the light flux is reflected and deflected (i.e. deflected for scanning) by deflecting means, and a sub-scanning direction is defined as the direction that is orthogonal to both the main scanning direction and the optical axis of scanning optical means. In addition, the vibration direction of wave surface of the scanning light flux is called a plane of polarization. In FIG. 1, the plane of polarization coincides with the plane of the drawing sheet.

In FIGS. 1 and 2, reference numeral 1 designates a laser light source serving as light source means, which is composed, for example, of a semiconductor laser. Reference numeral 2 designates a collimator lens, which converts divergent light flux emitted from the laser light source 1 into a substantially parallel light flux. Reference numeral 3 designates an aperture stop, which restricts a light flux passing through it to shape the beam. Reference numeral 4 designates a cylindrical lens, which has a certain power only in the sub-scanning direction, which images the light flux having passed through the aperture stop 3 onto a deflection surface (or reflection surface) 5a of a light deflector 5 (which will be described below) as a substantially linear image in a cross section in the sub-scanning direction.

Reference numeral 5 designates a light deflector serving as deflecting means, which is composed, for example, of a polygon mirror (i.e. a rotatory multi-surface mirror) having four faces. The light deflector 5 is rotated in the direction indicated by arrow A in FIG. 1 at a constant speed by driving means (not shown) such as a motor etc.

Reference numeral 6 designates a scanning lens system serving as scanning optical means having a light collecting function and an fθ characteristic, which has one or more optical surfaces that are provided with fine structure grating and includes first and second scanning lenses (two lenses in all) 6a and 6b. The scanning lens system 6 images a light flux corresponding to image information that has been reflected and deflected by the light deflector 5 onto a surface to be scanned, that is, a surface 7 of a photosensitive drum, while realizing a conjugate relationship between the deflection surface 5a of the light deflector 5 and the photosensitive drum surface 7 in the sub-scanning cross section, to thereby perform a field tilt correcting function in order to correct the surface inclination of the deflection surface 5a.

The above-described structure may be modified in such a way that a light flux emitted from the light source means 1 is made directly incident on the deflecting means 5 without using the above-described optical elements 2, 3 and 4.

Each lens surface of the first and second scanning lenses 6a and 6b has as a base shape, a known special aspheric shape in which the surface shape in the main scanning cross section shown as FIG. 1 is a curved surface shape of a spherical or aspheric surface while the surface shape in the sub-scanning cross section that is orthogonal to the main scanning direction has a curvature that changes away (i.e. toward the periphery of the scanning) from the on-axis position (i.e. the center of the scanning). In this first embodiment, fine structure gratings 8 made of a transparent resin material or a glass material are formed on all of the incidence surface 6a1 and the emergence surface 6a2 of the first scanning lens 6a and the incidence surface 6b1 and the emergence surface 6b2 of the second lens 6b.

The fine structure grating 8 according to the present invention is required to be formed only in the effective areas of the lens surfaces through which the light flux corresponding to image information passes, at least. Therefore, the fine structure gratings 8 may be formed either on the whole of the lens surfaces or in the effective areas on the lens surfaces.

In this embodiment, the grating pitch of each fine structure grating 8 is smaller than the wavelength of the light flux emitted from the laser source 1, and the arrangement direction of the fine structure grating 8 is the same all over the surface of the fine structure grating 8.

In this embodiment, a divergent light flux emitted from the laser light source 1 is converted by the collimator lens 2 into a substantially parallel light flux, and then the light flux is restricted (in its light quantity) by the aperture stop 3 and incident on the cylindrical lens 4. The substantially parallel light flux incident on the cylindrical lens 4 emerges from it without undergoing any modification with respect to the main scanning cross section. On the other hand, in the sub-scanning cross section, the light flux is converged so as to be imaged onto the reflecting surface 5a of the light deflector 5 as a substantially linear image (namely, a linear image that is longitudinal in the main scanning direction). The light flux reflected and deflected by the reflecting surface 5a of the light deflector 5 is imaged by means of the first and second scanning lens 6a and 6b onto the photosensitive drum surface 7 as a spot, whereby the imaged light spot scans the photosensitive drum surface 7 in the direction indicated by arrow B (i.e. the main scanning direction) at a constant speed, as the light deflector 5 is rotated in the direction indicated by arrow A. Thus, an image is recorded on the surface 7 of the photosensitive drum as a recording medium.

In connection with the scanning lens system 6 in FIG. 1, the light flux having a plane of polarization that is in the plane of the drawing sheet (i.e. in the scanning plane) is P-polarized light, while the light flux having a plane of polarization that is in the plane orthogonal to the plane of the drawing sheet is S-polarized light.

In this embodiment, the laser light source 1 is arranged in such a way that the light flux is incident on the scanning lens system 6 as a P-polarized light that has a plane of polarization within the plane of the drawing sheet. In other words, the laser light source 1 is so arranged that its horizontal transverse mode direction is substantially parallel to the surface to be scanned 7.

Figure 3:
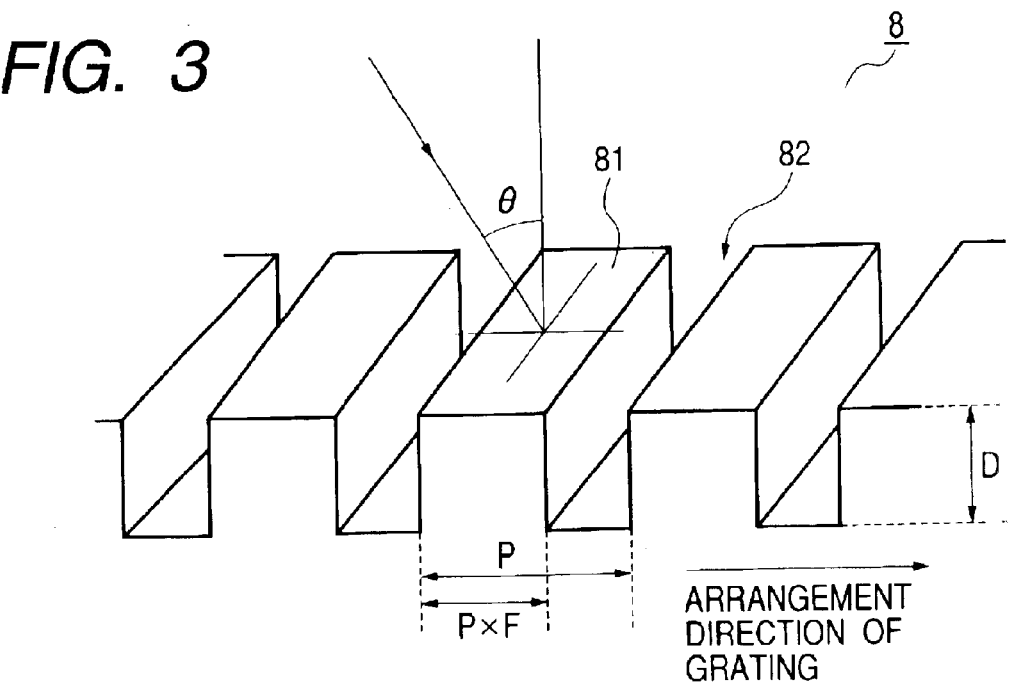
FIG. 3 is an enlarged view showing the fine structure grating in the first embodiment of the present invention.
Figure 4:
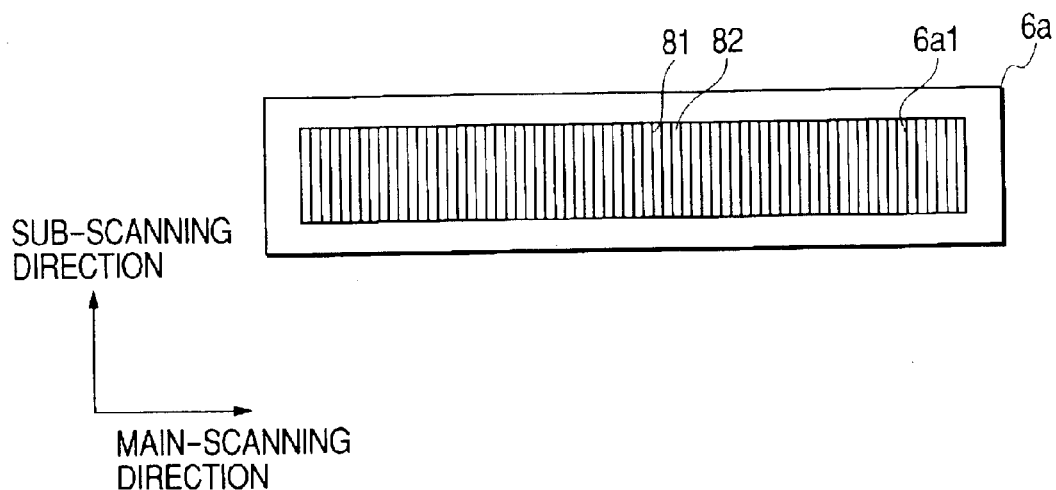
FIG. 4 is a drawing showing the direction of arrangement of the fine structure grating in the first embodiment of the present invention.

As described in the foregoing, in the scanning lens system 6 in this embodiment, the all of the incidence surface 6a1 and the emergence surface 6a2 of the first scanning lens 6a and the incidence surface 6b1 and the emergence surface 6b2 of the second lens 6b have special aspheric shapes as base shapes, on which fine structure gratings 8 shown in FIGS. 3 and 4 are formed, which is intended to reduce reflection of light at each incidence or emergence surface to suppress variations in the transmitted light quantity with changes in view angle.

The system according to this embodiment may be so modified that the fine structure grating 8 is provided on only one surface (e.g. the surface at which the angle of incidence is maximum) that has the greatest influence on generation of ghost light or flare light incident on the surface to be scanned 7. Alternatively, the fine structure grating 8 may be provided on one or more surfaces. The surface on which the fine structure grating 8 is provided may be a spherical surface, an aspheric surface, a rotationally asymmetrical surface, a diffraction surface or a planar surface.

As shown in FIG. 3, the fine structure grating 8 has a repeat or periodic structure in which grating portion 81 and non-grating portion 82 pairs are one-dimensionally (in the main scanning direction) arranged. The term "grating arrangement direction" is defined here as the direction in which the grating portions 81 and the non-grating portions 82 are periodically arranged, which corresponds to the horizontal direction (i.e. the longitudinal direction) in FIG. 3.

Assuming that P represents the grating pitch corresponding to the length of one period (or pair) of the grating portion 81 and the non-grating-portion 82 and F represents the grating constant, the length L of the grating portion 81 is L=F×P. In addition, it is assumed here that the depth of the grating is represented by D. Incidentally, the fine structure grating 8 may be formed integrally with a substrate (i.e. a glass substrate or a transparent resin substrate) that constitutes the optical surface.

As shown in FIG. 4, the grating of the fine structure grating 8 is oriented in a predetermined direction. In other words, the direction of arrangement is the same all over the surface of the fine structure grating. FIG. 4 is a drawing that shows the incidence surface 6a1 of the first scanning lens 6a as viewed from the light deflector 5, in which the grating portions 81 and the non-grating portions 82 are depicted in an exaggerated manner at a larger scale. The grating portions 81 and the non-grating portions 82 are oriented in the direction parallel to the sub-scanning direction and juxtaposed (or arranged) in the main scanning direction all over the incidence surface 6a1 of the first scanning lens 6a.

The light flux incident on the incidence surface 6a1 of the first scanning lens 6a is a P-polarized light, which has the plane of polarization parallel to the main scanning direction, and its parallel relationship to the grating arrangement direction is preserved constant irrespective of the image height (or view angle). In addition, the plane of polarization coincides with the main scanning direction, and the plane of polarization keeps a parallel relationship with the grating arrangement direction irrespective of the image height (or view angle).

In the fine structure grating 8, such a grating pitch P that satisfies a condition as a so-called zero-order grating is used. The fine structure grating 8 is called an SWS (sub-wave structure), the grating pitch of which is equal to or smaller than the order of the wavelength of the light emitted by a light source used in the system, and it is intended for utilization of zero-order light that does not involve a diffraction effect.

In the periodic fine structure grating, the zero-order grating is such a grating that does not generate diffraction light other than zero-order diffraction (See Optical Society of America Vol. 11, No. 10, October 1994, J.Opt.Soc.Am.A, p.2695 and Japanese Patent Publication No. 03-70201).

Generally, in periodic structure gratings, diffraction rays are generated at diffraction angles that satisfy the following condition for diffraction:

$$P(N_s \cdot \sin\theta_m - N_i \cdot \sin\theta_i) = m\lambda \quad (1)$$

where,

P: grating pitch,

Ni: refractive index of incidence side (medium of structure grating),

θi: angle of incidence,

θm: diffraction angle of m-th order,

Ns: refractive index of emergence side (medium of structure grating), m: order of diffraction, λ: wavelength used.

As will be apparent from condition (1), the diffraction angle meets $\theta m \geq \theta_1$ (m=1). According to the above-mentioned article in Optical Society of America, it is indicated that since the condition for preventing the generation of +1st-order diffraction light, under the condition that the light is incident perpendicularly, is:

$$\theta_{+1} \geq 90° \quad (2),$$

the condition for the zero-order grating is:

$$P < \lambda/(Ns + Ni \cdot \sin \theta i). \quad (3)$$

In connection with the above, at the outermost off-axis position, $\theta_{+1}$ is larger than 90 degrees, and so the grating pitch P will be a smaller pitch Pa. In the case in which the angle of incidence is not 0 (zero) degree, it is necessary to further reduce the grating pitch P.

In this embodiment, the following condition is satisfied:

$$Py < \lambda/(Ns + Ni \cdot \sin \theta i) \quad (4)$$

where, Py represents the pitch of the grating at position y from the center at which a light flux that will be incident on the surface to be scanned 7 at a predetermined image height passes, λ represents the wavelength of the light emitted from the light source means 1, λi represents the angle of incidence of the light flux at said position y, Ni represents the refractive index of the medium of the incidence side of the fine structure grating 8, and Ns is the refractive index of the medium of the emergence side of the fine structure grating 8.

Figure 5:
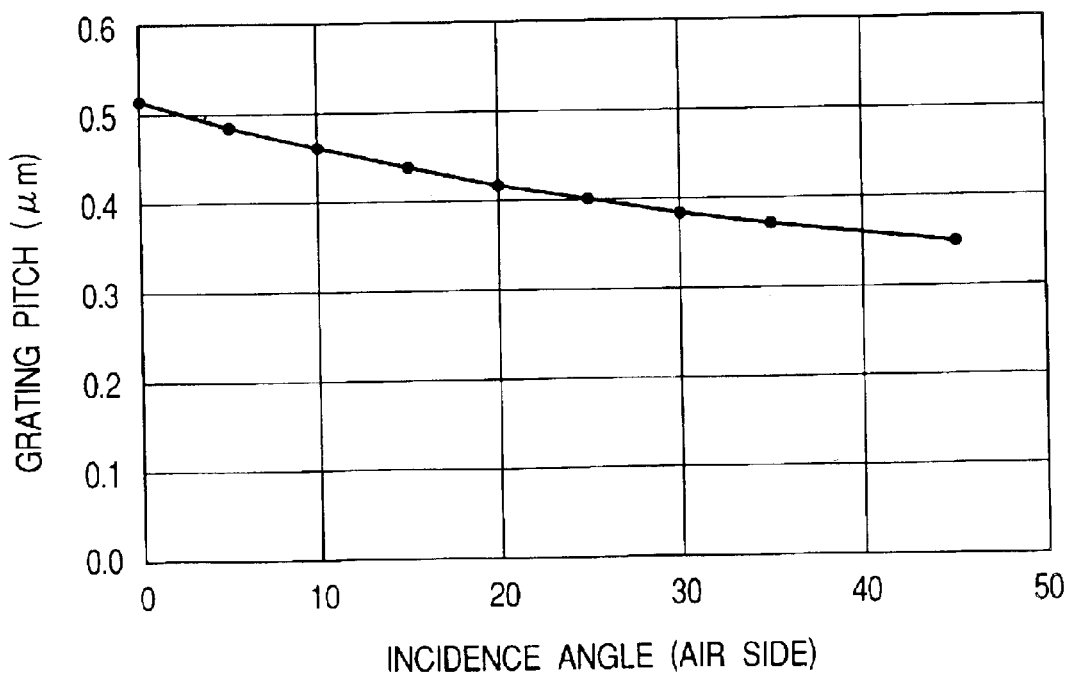
FIG. 5 is a graph showing a relationship between the grating pitch and the angle of incidence in the first embodiment of the present invention.

FIG. 5 shows a graph that illustrates how the grating pitch P of the zero-order grating should be in relation to the angle of incidence θi, wherein it is assumed that the refractive index n of the lens material is 1.524, and the wavelength λ of the used light is 780 nm (i.e. n=1.524, λ=780 nm). The graph shows the maximum pitch that satisfies the conditions for zero-order grating. In other words, gratings having pitches on or below the curve in the graph will not generate diffraction light other than 0-th order diffraction. As will be seen from this graph, in the case in which the angle of incidence θi is zero, that is, in the case of perpendicular incidence, a fine structure grating that has a grating pitch of 0.5 μm will act as a zero-order grating.

Incidentally, while in this embodiment a light flux having a wavelength of 780 nm is used, it should be understood that such laser light sources that emit light having a wavelength equal to or smaller than 1000 nm can be used in the present invention in view of the spot diameter on the surface of the photosensitive drum 7 that relates to the resolution.

However, in the case where the angle of incidence θi is 45 degrees, the fine structure grating having a grating pitch P of 0.5 μm does not satisfies the condition for the zero-order grating. It will be understood that a zero-order grating for the angle of incidence θi of 45 degrees is required to have a grating pitch smaller than 0.35 μm.

In this kind of scanning optical system as the system according to this embodiment, the angle of incidence θi of the light flux incident on each lens surface of the scanning lens system 6 (i.e. the incidence surface 6a1 and the emergence surface 6a2 of the first scanning lens 6a and the incidence surface 6b1 and the emergence surface 6b2 of the second lens 6b) at the position y on the lens surface is determinate. Therefore, the maximum grating pitch that satisfies the condition for the zero-order grating can be determined at every place on each of the lens surfaces.

Specifically, assuming that Pymax represents the grating pitch determined for the maximum angle of incidence θymax of the light flux incident on the fine structure grating 8, the fine structure grating 8 may be constructed to have a grating pitch that satisfies the following condition:

$$P < Pymax \quad (5)$$

When the maximum angle of incidence θymax=45°, the Pymax is about 0.35 μm, and therefore, the grating pitch smaller than this value may be used.

Next, a description will be made of the grating constant F mentioned before. It is known that regularly arranged particles made of optically isotropic material and having a size sufficiently larger than its molecule and smaller than the wavelength of light shows a structural birefringence. In KOUGAKUNO-GENRI Vol. 3 (Principle of Optics), Tokai University Press, p1030, it is described that a so-called rectangular grating like the grating shown in FIG. 3, in which the cross sectional shape of the grating in the arrangement direction is rectangular can be modeled as an aggregation of thin plane parallel plates corresponding to the grating portions 81 and the non-grating portions 82.

According to the above literature, due to the refractive indices of the materials of the grating portions 81 and the non-grating portions 82, structural birefringence is created, in which the refractive indices are different between two axes, one in the grating arrangement direction and the other in a direction perpendicular to the grating arrangement direction. In other words, the structural birefringence is created due to asymmetry of the grating and the plane of polarization. Therefore, care must be paid on the relationship between the grating arrangement direction and the direction of polarization of the laser used.

Figure 6:
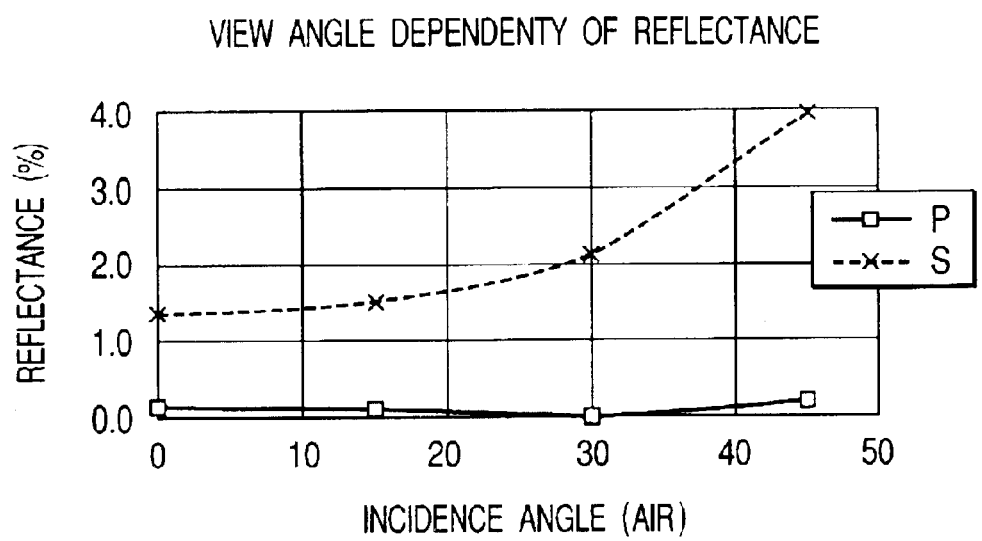
FIG. 6 is a graph illustrating influence of birefringence.

In the following, effects of the structural birefringence will be described. In FIG. 6, how the reflectance of zero-order diffraction light varies with the angle of incidence when P-polarized light and S-polarized light that have planes of polarization orthogonal to each other are incident on the grating surface of a rectangular grating as shown in FIG. 3 with the grating pitch P=0.3 μm, the grating constant F=0.60, the grating depth D=0.16 μm, the refractive index of the material n=1.524, and the used wavelength λ=780 nm.

Figure 17:
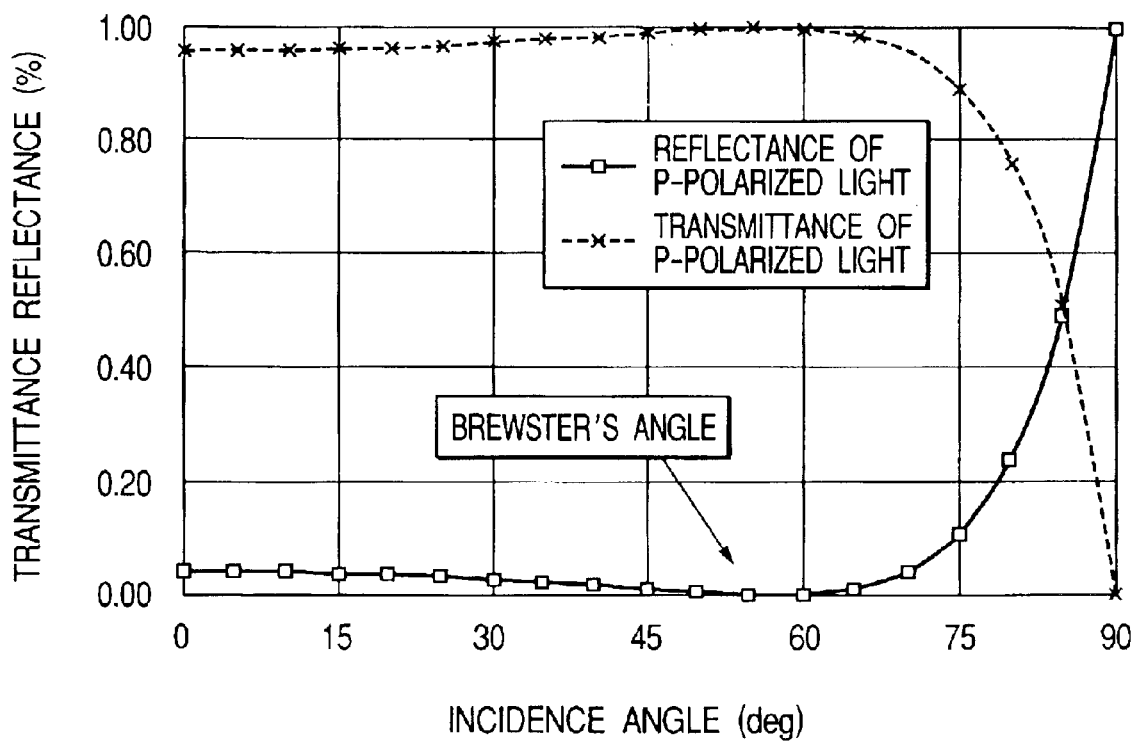
FIG. 17 is a graph illustrating incidence angle dependency of reflectance of P-polarized light and S-polarized light.

What is characteristic in this graph as compared to the graph of FIG. 17 that shows a case of Fresnel reflection is the values at the angle of incidence of 0 degree. In the case shown in FIG. 17, there is no difference in reflectance at the angle of incidence of 0 degree between the polarized light fluxes that have planes of polarization orthogonal to each other. On the other hand, in the case of fine structure grating having structural birefringence shown in FIG. 6, there is a difference in the properties of polarized light orthogonal to each other even at the angle of incidence of 0 degree, and the difference in the properties becomes larger, as the angle of incidence increases. This means that the reflectance properties will change drastically depending on the relationship between the grating arrangement direction and the direction of the plane of polarization. Therefore, when the fine structure grating is used, care must be paid on the relationship between the grating arrangement direction and the direction of polarization of the laser used in the system.

In view of the above, this embodiment is arranged in such a way that the relationship between the grating arrangement direction and the direction of the plane of polarization is constant all over the surface of the fine structure grating. Specifically, the fine structure grating is arranged in such a way that the grating arrangement direction and the plane of polarization of the incident light flux (in other words, the grating arrangement direction and the main scanning direction) are parallel (in other words, the groves of the grating and the plane of polarization are perpendicular).

Specifically, in the arrangement shown in FIG. 1, the polarization direction of the light flux is P-polarization (i.e. the plane of polarization is parallel with the plane of the drawing sheet, the direction of the polarization of the light flux), and the plane of polarization of the light flux and the grating arrangement direction of the fine structure grating are in a parallel relationship, which is maintained all over the fine structure grating.

In this embodiment, the fine structure grating 8 is so optimized that variations in the transmittance of the P-polarized light of the 0-th order light would be small irrespective of the angle of incidence. Thus, the shape of the fine structure grating 8 is determined to have the following dimensions for the used wavelength $\lambda=780$ nm and the refractive index of the scanning lenses n=1.524, that is, the grating pitch P=0.3 $\mu$m, the grating constant F=0.65 and the depth of the grating D=0.16 $\mu$m. The transmittance characteristic of a grating having this shape in relation to the angle of incidence is as shown in FIG. 7.

Figure 7:
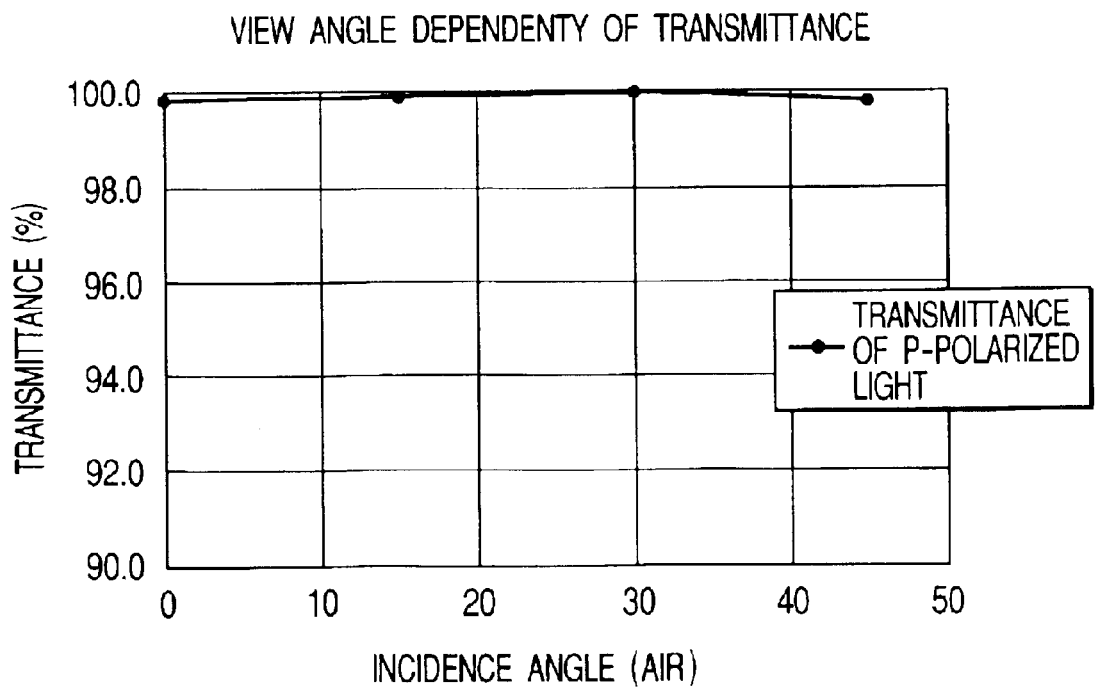
FIG. 7 is a graph showing a relationship between the transmittance and the angle of incidence in the first embodiment of the present invention.

As will be seen from the graph of FIG. 7, the grating has a transmittance larger than 99.8% in the incident angle range of 0 to 45 degrees, that is, the Fresnel reflectance of the grating is 0.2% or less. As compared to the conventional system shown in FIG. 17, which has a reflectance for P-polarized light of 4%, the reflectance is improved twenty times or more, and it is improved to be less than 1%, which generates little flare that affects the image.

In this embodiment, in order to reduce Fresnel reflection generated at each lens surface, the grating pitch, the grating depth and the grating constant are determined in accordance with the angle of incidence at the position in the fine structure grating at which the light flux to be delivered to a certain image height passes. In addition, influence of structural birefringence is eliminated to reduce flare light and ghost light incident on the surface to be scanned 7, so that it is possible to provide a scanning optical system that can output images with good image quality.

While the system according to this embodiment is so designed that the Fresnel reflection generated at each lens surface is 0.2% or less, the allowable range for the Fresnel reflection generated at each lens surface would be 1% or less.

In this embodiment, Fresnel reflection at lens surfaces, which can cause flare or ghost images, can be reduced without requiring additional process such as coating, and so the degree of uniformity (or evenness) in the light quantity distribution on the surface to be scanned can be improved and the illuminance distribution can be made substantially uniform over a wide area on the surface to be scanned.

In this embodiment, each of the surfaces of the first and second scanning lenses 6a and 6b are designed to have, as the base shape, a known special aspheric shape in which the surface shape in the main scanning cross section is a spherical or aspheric surface and the surface shape in the sub-scanning cross section has a curvature that changes away from the on-axis position. However, the surface shape is not limited to this, but it may be other shapes as long as the lenses are so-called f$\theta$ lenses that have a function (or f$\theta$ characteristic) to image the light flux having been reflected and deflected onto the surface to be scanned as a spot to scan the surface at constant speed.

In this embodiment, the laser light source 1 is arranged in such a way that light flux is incident on the scanning lens system 6 as substantially P-polarized light. However, the invention is not limited to such an arrangement, and it may be so modified that the light flux is incident on the scanning system 6 as S-polarized light.

Figure 8:
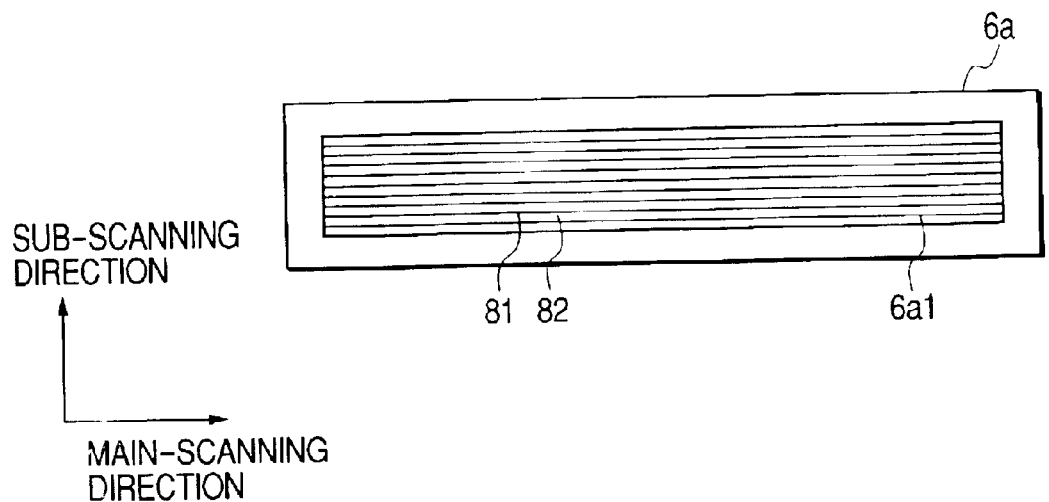
FIG. 8 is a drawing showing the direction of arrangement of the second fine structure grating.

Furthermore, the direction of grating arrangement of the fine structure grating 8 is not limited to the scanning direction as is the case with the example shown in FIG. 4, but the grating may be arranged in the sub-scanning direction as shown in FIG. 8. In that case, the system may be arranged in such a way that the grating arrangement direction is perpendicular to the plane of polarization of the incident P-polarized light flux (or to the main scanning plane) (i.e. the plane of polarization and the grooves of the grating are parallel). Alternatively, the system may be arranged in such a way that the plane of polarization and the grating arrangement direction form an angle of 45 degrees. The system may also be arranged in such a way that the relationship between the plane of polarization and the grating arrangement direction includes any two of the above-mentioned parallel relationship, perpendicular relationship and 45 degrees relationship.

Figure 9:
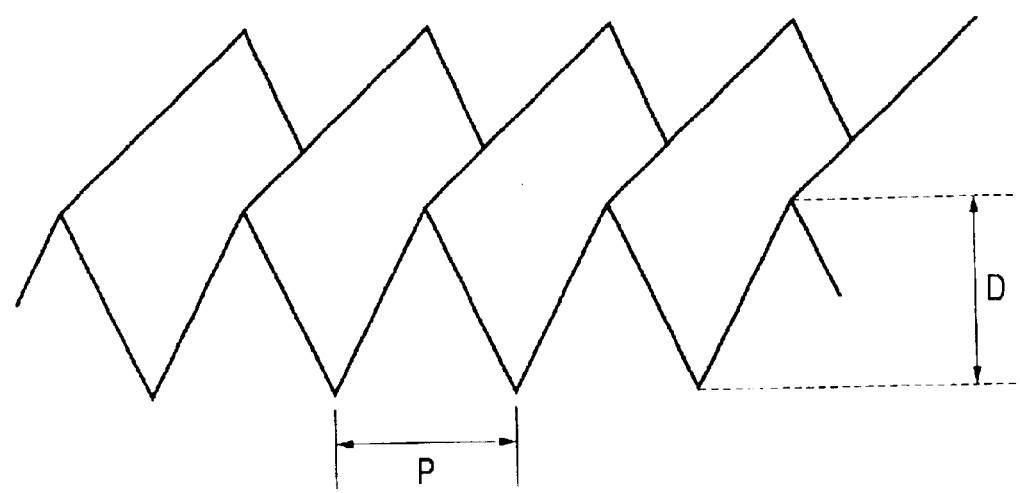
FIG. 9 is a drawing showing an alternative shape of a grating.

In this embodiment, the grating structure that is formed by arranging rectangular cross sections one-dimensionally is used. However, the grating is not limited to this, and the shape of the grating may be triangular as shown in FIG. 9, trapezoidal, sine-curve-like shape, or substantially rectangular, substantially triangular, substantially trapezoidal or substantially sine-curve-like shape formed by stacked steps.

The fine structure grating on a lens surface can be formed by injection molding using a mold on which the shape of the fine structure grating is formed.

In this embodiment, the scanning lens system 6 is composed of two lenses, but the invention is not limited to this. The scanning lens system 6 may be composed of one or more than two lenses.

Embodiment 2

Figure 10:
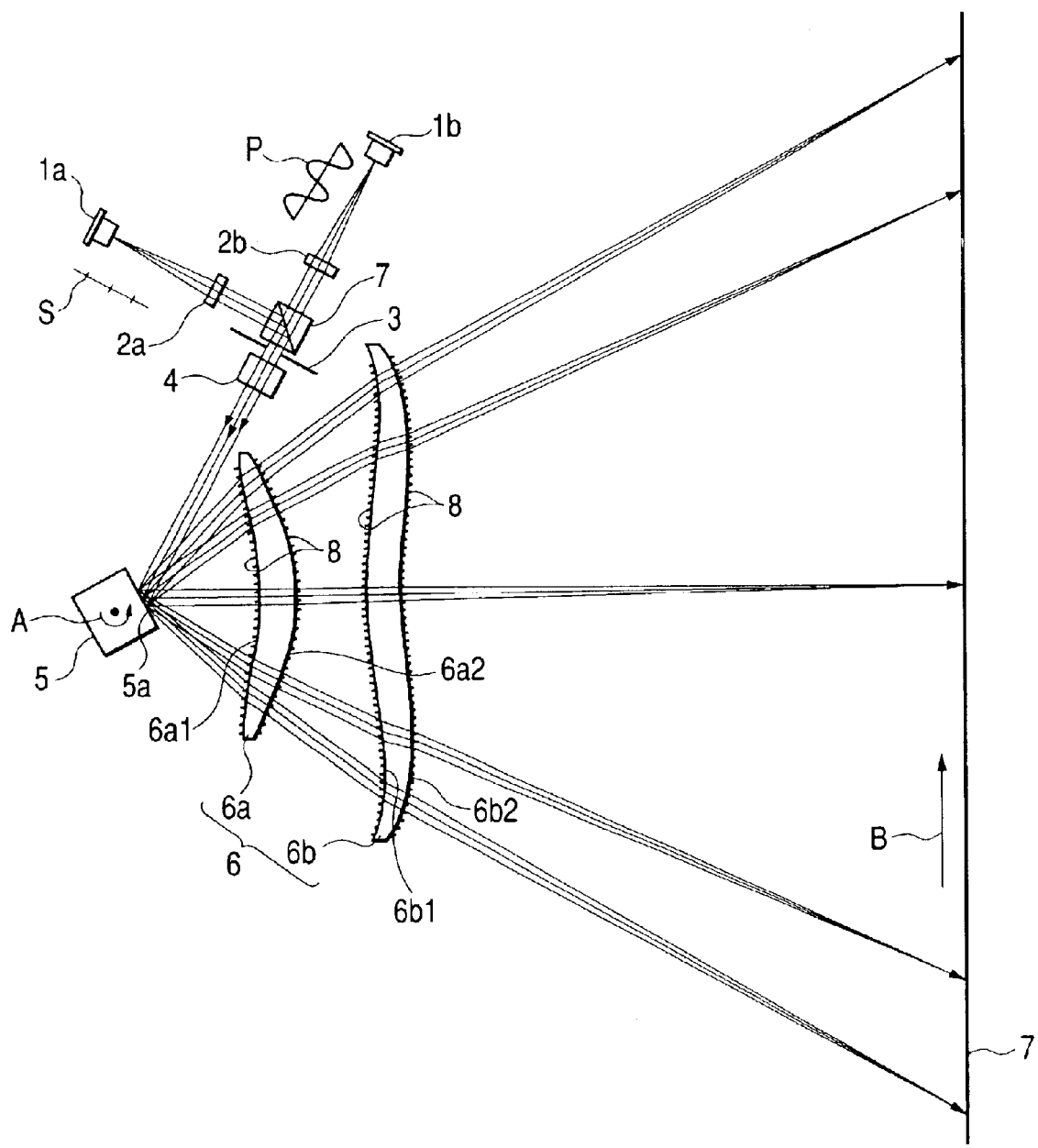
FIG. 10 is a cross sectional view of the second embodiment of the present invention taken at its main scanning plane.

In the following, a second embodiment of the present invention will be described with reference to FIGS. 10 to 12. FIG. 10 is a cross sectional view in the main scanning direction (main scanning cross section) showing the principal portion of a scanning optical system (or optical scanning apparatus) according to the second embodiment of the present invention. In FIG. 10, the components same as those shown in FIG. 1 are designated by the same reference signs.

This second embodiment differs from the above-described first embodiment in that, the light source means is composed of two laser light sources 1a and 1b with the directions of polarization of a plurality of fluxes incident on the fine fine structure grating 8 being different from each other and the arrangement of the fine structure grating 8 is line symmetrical with respect to the direction of the composition (or sum) of the vectors that represents the directions of polarization of the plurality of light fluxes. The other structures and optical operations of this embodiment are the same as those in the first embodiment, and the second embodiment is also realizes the advantageous effects same as the first embodiment.

In FIG. 10, reference signs 1a and 1b designate laser light sources, which are composed, for example, of semiconductor lasers. Reference signs 2a and 2b designate collimator lenses provided for the laser light sources 1a and 1b respectively. The collimator lenses 2a and 2b respectively convert divergent light fluxes emitted from the corresponding laser light sources 1a and 1b into substantially parallel light fluxes in the main scanning cross section. While in this embodiment, the collimator lenses are designed as systems that convert the light fluxes into substantially parallel light fluxes in the main scanning cross section, the invention is not limited to this, and the light fluxes may be converted into substantially convergent light fluxes or divergent light fluxes.

Reference sign 7 designates beam synthesizing means, which is composed, for example, of a polarizing beam splitter. The beam synthesizing means 7 synthesizes the light paths of the two light fluxes that have been converted into substantially parallel light fluxes by the collimator lenses 2a and 2b. Therefore, the divergent light fluxes emitted from the two laser light sources 1a and 1b are required to be arranged in such a way that the plane of polarizations of them are orthogonal to each other. Thus, the laser light source 1a emits S-polarized light having a plane of polarization perpendicular to the plane of the drawing sheet, while the laser light source 1b emits P-polarized light having a plane of polarization that coincides with the plane of the drawing sheet, to the beam synthesizing means 7. Therefore, the two light fluxes incident on the fine structure grating 8 are P-polarized light and S-polarized light at the incidence surface of the fine structure grating 8.

The laser light source 1a and 1b may be multi-laser light sources each of which has two or more light emitting points having the same plane of polarization.

While this embodiment is designed in such a way that two light fluxes are synthesized, the present invention is not limited to this, and it can be also applied to systems in which three or more light fluxes are synthesized.

In addition, the present invention is not limited to systems provided with beam synthesizing systems using beam synthesizing means 7, but it can be applied to other type of systems as far as two or more light fluxes having different planes of polarization are synthesized.

The system according to this embodiment is further provided with a synchronization detection optical system (or a BD optical system) for determining timing of image writing position on the surface to be scanned, though it is not shown in FIG. 10.

In this embodiment, the all of the incidence surface 6a1 and the emergence surface 6a2 of the first scanning lens 6a and the incidence surface 6b1 and the emergence surface 6b2 of the second lens 6b in the scanning optical system 6 have special aspheric shapes as their base shape, on the surfaces of which the rectangular fine structure gratings 8 shown in FIG. 3 are formed, in a like manner as the lenses in the above-described first embodiment. Nevertheless, the grating arrangement direction of the fine structure grating 8 is different from the first embodiment, namely, the grating is arranged in such a way as to be line symmetrical with respect to the direction of composition (or sum) of the vectors representing the polarization directions of two light fluxes as shown in FIG. 11. This is intended to reduce reflection light at each incidence or emergence surface to suppress variations in the transmitted light quantity with changes in the view angle.

The fine structure grating 8 according to the present invention is required to be formed only in the effective areas of the lens surfaces through which the light flux corresponding to image information passes, at least. Therefore, the fine structure gratings 8 may be formed either on the whole of the lens surfaces or in the effective areas on the lens surfaces.

The system according to this embodiment may be so modified that the fine structure grating 8 is provided on only one surface (e.g. the surface at which the angle of incidence is maximum) that has the greatest influence on generation of ghost light or flare light incident on the surface to be scanned 7. Alternatively, the fine structure grating 8 may be provided on one or more surfaces. The surface on which the fine structure grating 8 is provided may be a spherical surface, an aspheric surface, a rotationally asymmetrical surface, a diffraction surface or a planar surface.

The fine structure grating 8 has a repeat or periodic structure as shown in FIG. 3, in which grating portion 81 and non-grating portion 82 pairs are one-dimensionally (in the main scanning direction) arranged. As will be seen from FIG. 11, the grating arrangement direction of the fine structure grating is designed in such a way as to be line symmetrical with respect to the direction of composition of the vector representing the polarization direction of the two light fluxes, which is different from the first embodiment.

Assuming that P represents the grating pitch corresponding to the length of one period (or pair) of grating portion 81 and non-grating portion 82 and F represents the grating constant, the length L of a grating portion 81 is $L = F \times P$. In addition, it is assumed here that the depth of the grating is represented by D. Incidentally, the fine structure grating 8 may be formed integrally with a substrate (i.e. a glass substrate or a transparent resin substrate) that constitutes the optical surface.

Figure 11:
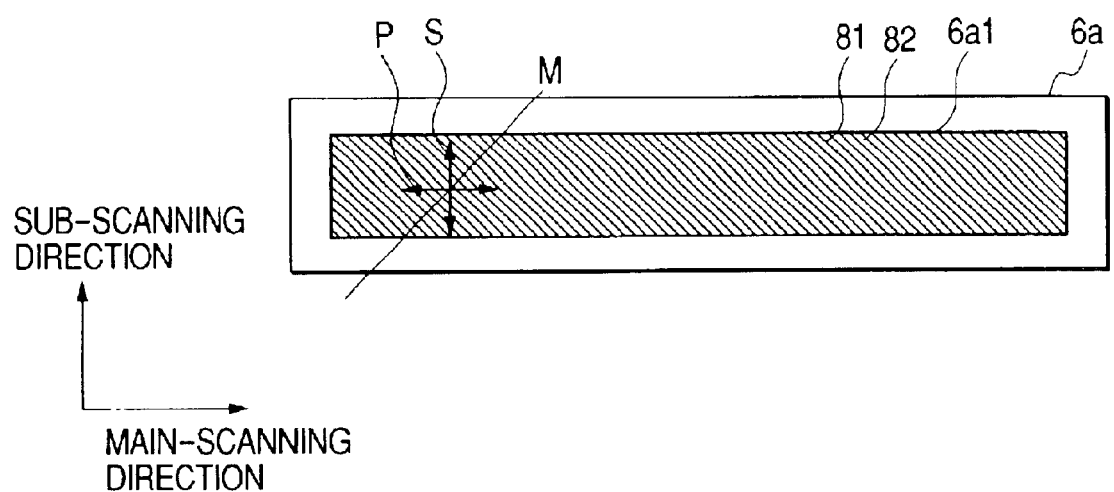
FIG. 11 is a drawing showing the direction of arrangement of the third fine structure grating.

As shown in FIG. 11, the grating of the fine structure grating 8 is oriented in a predetermined direction. FIG. 11 is a drawing that shows the incidence surface 6a1 of the first scanning lens 6a as viewed from the light deflector 5, in which the grating portions 81 and non-grating portions 82 are depicted in an exaggerated manner at a larger scale. The grating portions 81 and the non-grating portions 82 are oriented in a mid-direction between the main scanning direction and the sub-scanning direction at an angle of 45° and juxtaposed (or arranged) in the direction orthogonal to that orientation direction all over the incidence surface 6a1 of the first scanning lens 6a.

The light fluxes incident on the incidence surface 6a1 of the first scanning lens 6a are P-polarized and S-polarized light fluxes, which have the plane of polarization parallel to the main scanning direction and the plane of polarization perpendicular to the main scanning direction respectively. Each of these planes of polarization is at an angle of 45° relative to the grating arrangement direction, and such a relationship to the grating arrangement direction is preserved constant irrespective of the image height (or view angle).

This means that the grating is arranged in such a way as to be line symmetrical with respect to the direction of composition of the vectors representing the polarization directions of the two light fluxes (which is represented by line M in FIG. 11).

In addition, the planes of polarization (P-polarization and S-polarization) of the two light fluxes are at an angle of 45° relative to the grating arrangement direction of the grating respectively, and such a relationships to the grating arrangement direction is preserved constant irrespective of the image height (or view angle). In other words, the direction of arrangement of the fine structure grating 8 is at an angle of 45° relative to the scanning plane.

The fine structure grating 8 is a so-called zero-order grating, the pitch of which can be determined in the same manner as in the first embodiment.

The fine structure grating 8 in this embodiment 8 also has structural birefringence, but it is intended in this embodiment to reduce influence of the structural birefringence by arranging the planes of polarization of two light fluxes and the grating arrangement direction in a predetermined relationship.

Specifically, the fine structure grating 8 is arranged to be line symmetrical with respect to a mid-direction (designated by M in FIG. 11) between the plane of polarization (P and S in FIG. 11) of the two light fluxes, that is, with respect to the direction of the composition (direction M) of the vectors representing the polarization directions of the two light fluxes, so that the angles formed by the grating arrangement direction of the fine structure grating 8 and those planes of polarization would be equal to each other. In other words, the relationship between the incident light fluxes, which are substantially S-polarized light and P-polarized light with respect to the incidence surface of the fine structure grating 8, and the fine structure grating 8 arranged to form angles of 45° with the planes of polarization is preserved all over the surface of the fine structure grating.

By virtue of the equality of the angles formed by the grating arrangement direction of the fine structure grating 8 and the planes of polarization, it is possible to reduce influence of the structural birefringence due to the symmetry of the grating with respect to the planes of polarization.

In this embodiment, the fine structure grating 8 is so optimized that variations in the transmittance of the P-polarized light and S-polarized light of the 0-th order light would be small irrespective of the angle of incidence. Thus, the shape of the fine structure grating 8 is determined to have the following dimensions for the used wavelength $\lambda$=780 nm and the refractive index of the scanning lenses n=1.524, that is, the grating pitch P=0.3 $\mu$m, the grating constant F=0.45 and the depth of the grating D=0.18 $\mu$m. The transmittance characteristic of a grating having this shape in relation to the angle of incidence is as shown in FIG. 11.

Incidentally, while in this embodiment a light flux having a wavelength of 780 nm is used, it should be understood that such laser light sources that emit light having the wavelength equal to or smaller than 1000 nm can be used in the present invention in view of the spot diameter on the surface of the photosensitive drum 7 that relates to the resolution.

Figure 12:
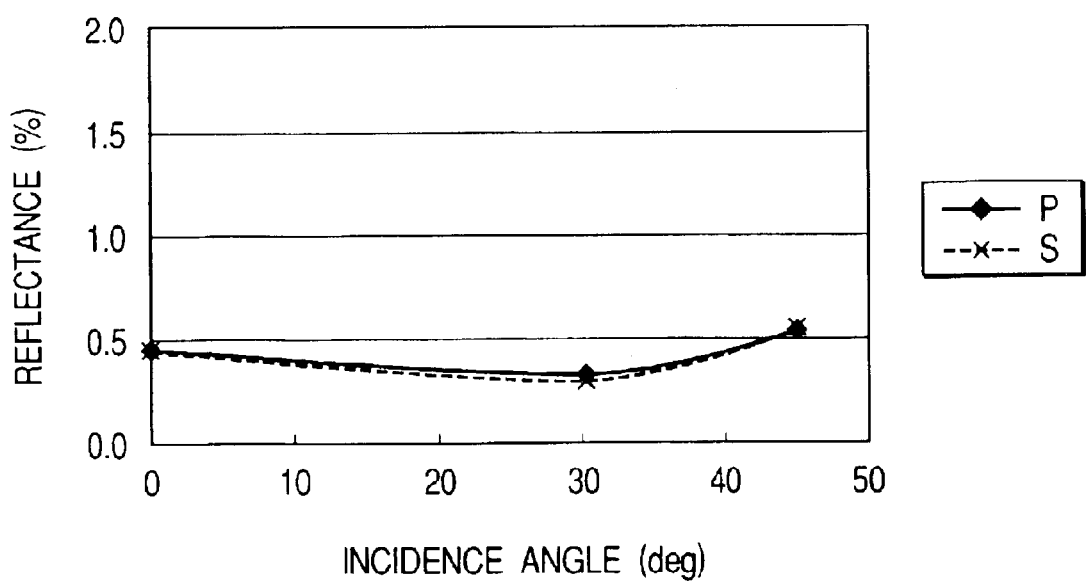
FIG. 12 is a graph showing a reflectance characteristic of the grating in the second embodiment.

As will be seen from FIG. 12, the reflectance is less than 0.5% for the incidence angle range of 0 to 45 degrees on the optical element, which means that the loss of the transmittance is 0.5% at most. As compared to the conventional system shown in FIG. 17, the reflectance characteristics for P-polarized light and S-polarized light are greatly improved, namely they are improved to be less than 1%, which generates little flare that affects the image.

While the system according to this embodiment is so designed that the Fresnel reflection generated at each lens surface is 0.5% or less, the allowable range for the Fresnel reflection generated at each lens surface would be 1% or less.

In this embodiment, the grating pitch, the grating depth and the grating constant are determined in such a way as to reduce Fresnel reflection generated at each lens surface. In addition, influence of structural birefringence is eliminated to reduce flare light and ghost light incident on the surface to be scanned 7, so that it is possible to provide a scanning optical system that can output images with good image quality.

In this embodiment, Fresnel reflection at lens surfaces, which can cause flare or ghost images, can be reduces without requiring additional process such as coating, so that the degree of uniformity (or evenness) in the light quantity distribution on the surface to be scanned can be improved and the illuminance distribution can be made substantially uniform over a wide area on the surface to be scanned.

Figure 13:
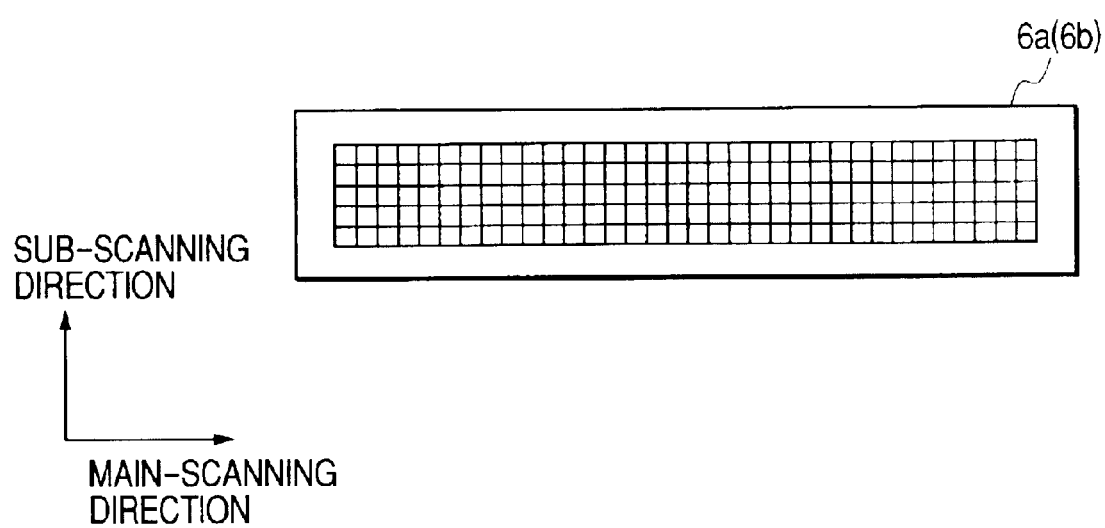
FIG. 13 is drawing showing the direction of arrangement of the fourth fine structure grating.
Figure 14:
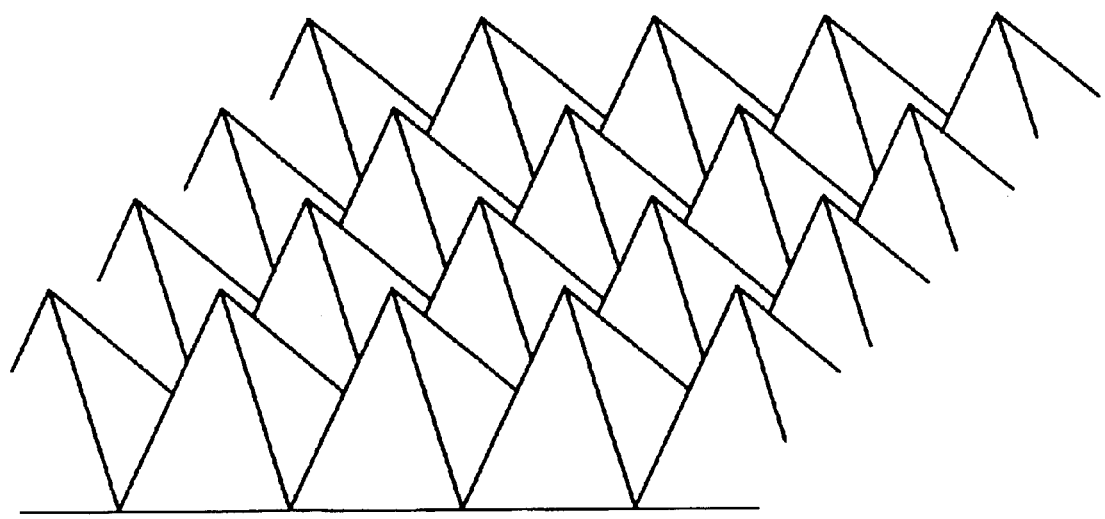
FIG. 14 is a drawing illustrating another shape of a grating.

The grating in the fine structure grating may be arranged to be isotropic in both the main scanning direction and the sub-scanning direction as shown in FIG. 13. In that case also, the arrangement of the grating is line symmetrical with respect to the mid-direction of the planes of polarization of two light fluxes. The shape of the grating may be quadrangular pyramid as shown in FIG. 14.

In this embodiment, each of the surfaces of the first and second scanning lenses 6a and 6b are designed to have as the base shape, a known special aspheric shape in which the surface shape in the main scanning cross section is a spherical or aspheric surface and the surface shape in the sub-scanning cross section has a curvature that changes away from the on-axis position. However, the surface shape is not limited to this, but it may be other shapes as long as the lenses are so-called f$\theta$ lenses that have a function (or f$\theta$ characteristic) to image the light flux having been reflected and deflected onto the surface to be scanned as a spot to scan the surface at constant speed.

In this embodiment, the grating structure that is formed by arranging rectangular cross sections one-dimensionally is used. However the grating is not limited to this, but the shape of the grating may be triangular as shown in FIG. 9, trapezoidal, sine-curve-like shape, or substantially rectangular, substantially triangular, substantially trapezoidal or substantially sine-curve-like shape formed by stacked steps. The fine structure grating on a lens surface can be formed by injection molding using a mold on which the shape of the fine structure grating is formed.

Color Image Forming Apparatus

Figure 15:
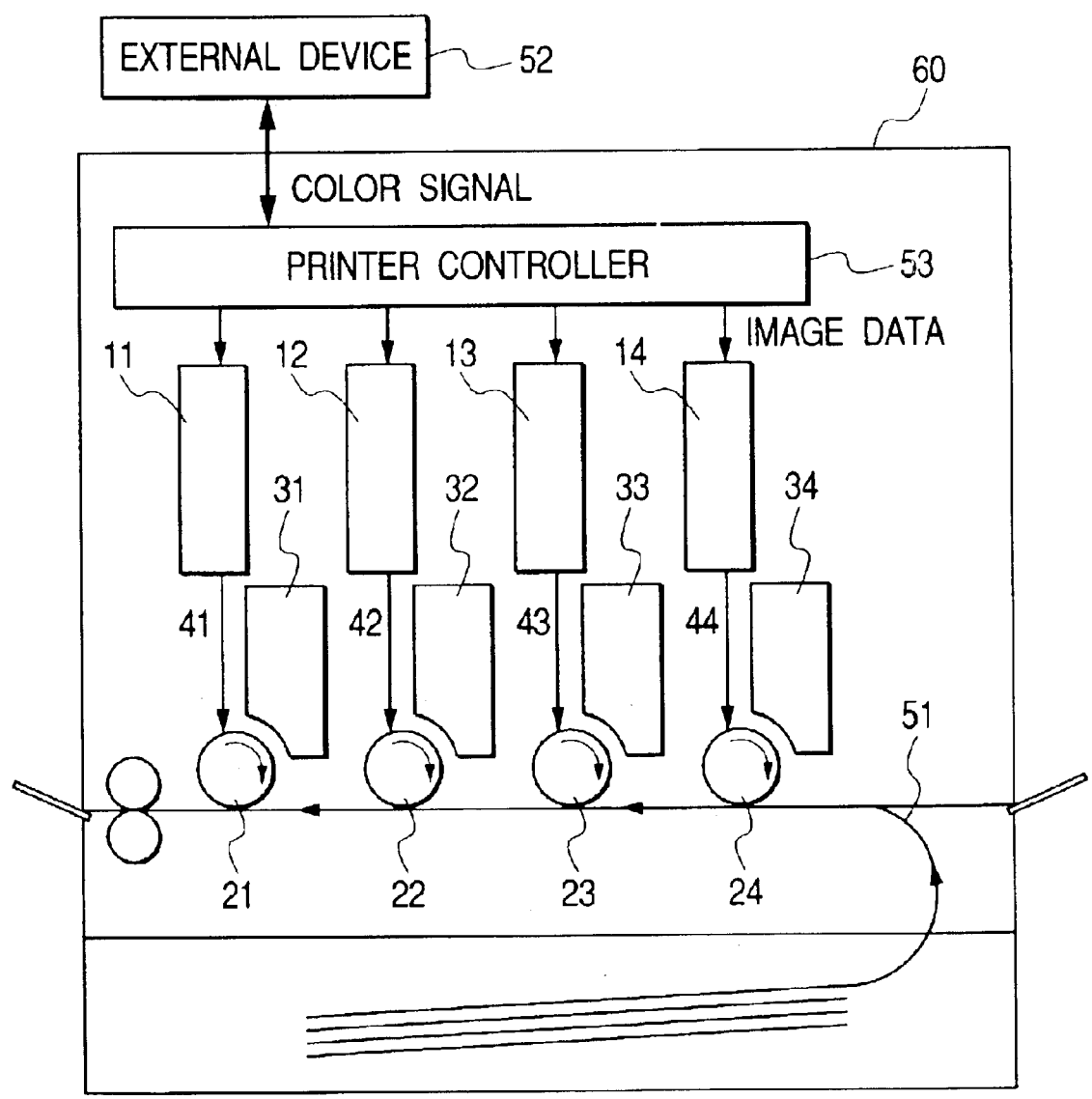
FIG. 15 is a diagram schematically showing the principal portion of a color image forming apparatus according to an embodiment of the present invention.
Figure 16:
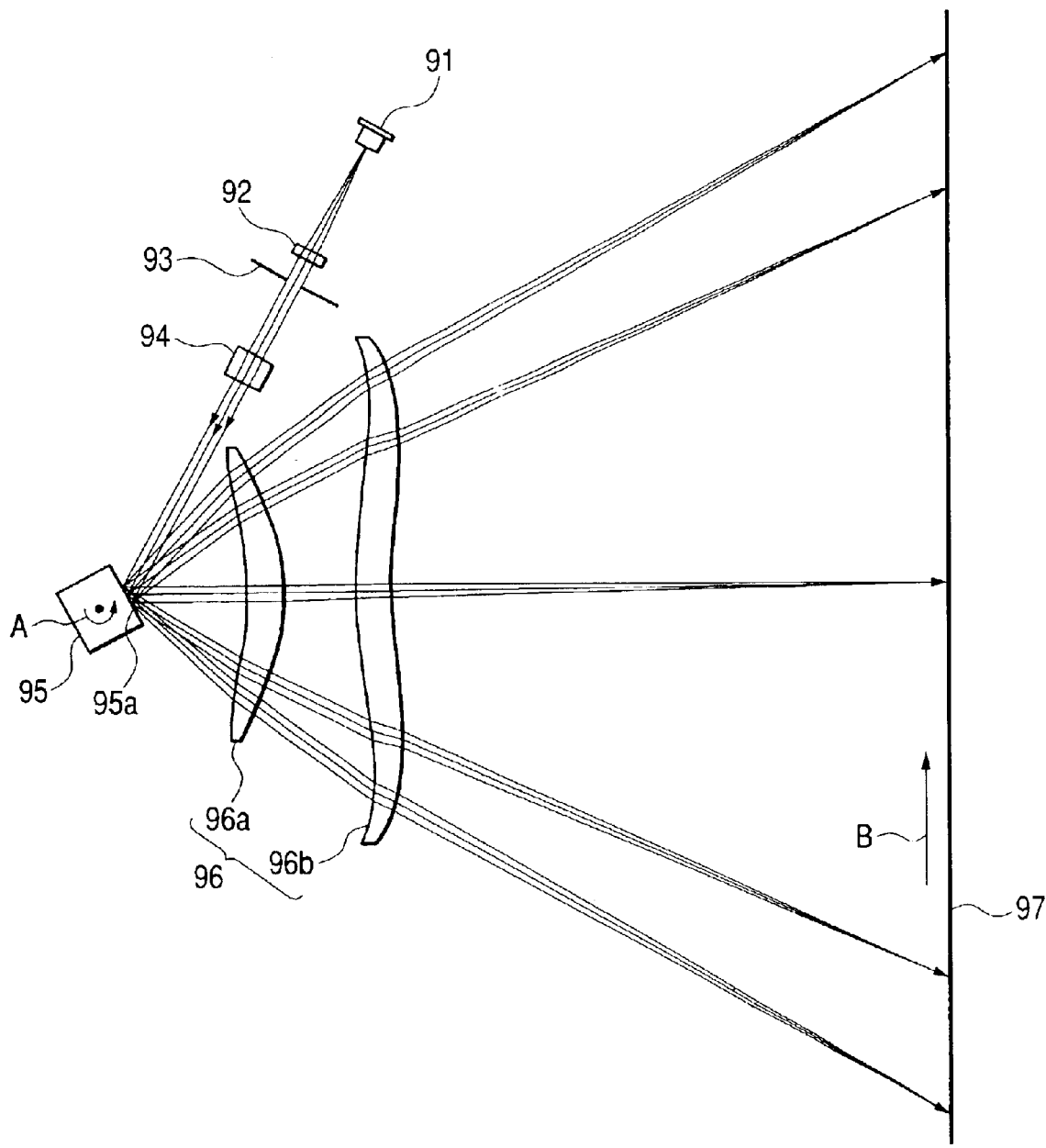
FIG. 16 is a cross sectional view of a conventional scanning optical system taken at its main scanning plane.

FIG. 15 is a diagram schematically showing the principal portion of a color image forming apparatus as an embodiment of the present invention. This embodiment is a tandem type color image forming apparatus in which four optical scanning apparatus (or scanning optical systems) are provided side by side to record image information concurrently on the surfaces of corresponding drums serving as image bearing members respectively. In FIG. 15, reference numeral 60 designates the color image forming apparatus, reference numerals 11, 12, 13 and 14 designate optical scanning apparatus each of which has a structure the same as either one of the first and second embodiments described above, reference numerals 21, 22, 23 and 24 designate photosensitive drums serving as image bearing members, reference numerals 31, 32, 33, 34 designate developing devices and reference numeral 51 designates a transfer belt. The apparatus shown in FIG. 15 is further provided with a transferring device (not shown) for transferring toner images having been developed by the developing devices onto a transferring material and a fixing device for fixing the toner images transferred on the transferring material.

The color image forming apparatus 60 shown in FIG. 15 is fed with color signals corresponding to R (red), G (green) and B (blue) respectively from an external device 52. These color signals are converted by a printer controller 53 provided in the apparatus into image data (in the form of dot data) corresponding to C (cyan), M (magenta), Y (yellow) and B (black) respectively. These image data are input to optical scanning apparatus 11, 12, 13 and 14 respectively. The optical scanning apparatus 11, 12, 13 and 14 emit light beams 41, 42, 43 and 44 that are modulated in accordance with the corresponding image data, and the photosensitive surfaces of the photosensitive drums 21, 22, 23 and 24 are scanned in the main scanning direction by these light beams respectively.

The color image forming apparatus according to this embodiment has four optical scanning apparatus 11, 12, 13 and 14 juxtaposed side by side, which correspond the colors of C (cyan), M (magenta), Y (yellow) and B (black) respectively. These scanning apparatus record image signals (or image information) concurrently on the surfaces of the photosensitive drums to print a color image at high speed.

The color image forming apparatus according to this embodiment forms latent images of respective colors on the surfaces of the corresponding drums 21, 22, 23 and 24 by means of the above-described four optical scanning apparatus 11, 12, 13 and 14 using light beams corresponding to respective image data. Then the color image forming apparatus transfers the images onto a recording material in a superimposed manner to form a single color image.

The above-mentioned external device 52 may include a color image reading apparatus having a CCD sensor. In that case, a color digital copying machine composed of the color image reading apparatus and the color image forming apparatus 60 will be realized.

While in this embodiment, the optical scanning apparatus according to the first or second embodiment is applied to a color image forming apparatus, it may also be applied to a monochrome image forming apparatus, as will be apparent.

According to the present invention, an optical element provided with a fine structure grating that can adjust variations in the transmitted light quantity due to changes in the angle of incidence of a light flux across the central portion to the peripheral portion is applied to a scanning optical system. Therefore, variations in the transmitted light due to changes in the angle of incidence of the light flux can be easily adjusted. In particular, it is possible to reduce influence of birefringence generated depending on the relationship between the grating arrangement direction of a fine structure grating and the plane of polarization of a light flux. Thus, it is possible to realize a scanning optical system having good optical performance and an image forming apparatus using such a scanning optical system.

Furthermore, with the present invention, it is possible to realize such a scanning optical system and an image forming apparatus using such a scanning optical system in which Fresnel reflection at lens surfaces, which can cause flare or ghost images, can be reduces without requiring additional process such as coating, so that the degree of uniformity (or evenness) in the light quantity distribution on the surface to be scanned is improved, and the illuminance distribution can be made substantially uniform over a wide area on the surface to be scanned.

What is claimed is:

1. A scanning optical system comprising:
   a laser light source;
   deflecting means for deflecting a light flux emitted from said laser light source; and
   scanning optical means for imaging the light flux deflected by said deflecting means onto a surface to be scanned,
   wherein said scanning optical means comprises at least one optical surface that has a fine structure grating having a grating pitch smaller than the wavelength of the light flux emitted from said laser light source,
   wherein the direction of arrangement of said fine structure grating is the same all over the surface of said fine structure grating, and
   wherein the direction of arrangement of said fine structure grating forms an angle of 45 degrees with the direction of a plane of polarization of an incident light flux.

2. A scanning optical system comprising:
   a laser light source;
   deflecting means for deflecting a light flux emitted from said laser light source; and
   scanning optical means for imaging the light flux deflected by said deflecting means onto a surface to be scanned,
   wherein said scanning optical means comprises at least one optical surface that has a fine structure grating having a grating pitch smaller than the wavelength of the light flux emitted from said laser light source, and
   wherein the directions of polarization of a plurality of light fluxes incident on said fine structure grating are different from each other, and the direction of arrangement of said fine structure grating is arranged to be line symmetrical with respect to a composition of vectors representing the directions of polarization of said plurality of light fluxes.

3. A scanning optical system according to claim 2, wherein said plurality of light fluxes incident on said fine structure grating are P-polarized light and S-polarized light with respect to an incidence surface of said fine structure grating, and the direction of arrangement of said fine structure grating is a direction that forms an angle of 45 degrees with a scanning plane.

4. A scanning optical system according to claim 2, further comprising another laser light source, wherein said deflecting means is also for deflecting a light flux emitted from said another laser light source, wherein said scanning optical means is also for imaging the light flux emitted from said another laser light source onto said surface to be scanned, and wherein said plurality of light fluxes correspond respectively to said laser light source and said another laser light source.

5. An image forming apparatus comprising:
   a scanning optical system according to any one of claims 1, 2, 3, and 4;
   a photosensitive member disposed at said surface to be scanned;
   a developing device that develops an electrostatic latent image formed on said photosensitive member by a scanning light flux from said scanning optical system as a toner image;
   a transferring device that transfers the developed toner image onto a transferring material;
   a fixing device that fixes the transferred toner image on the transferring material; and
   a printer controller that converts code data input from an external device into an image signal and inputs it to said scanning optical system.

* * * * *

UNITED STATES PATENT AND TRADEMARK OFFICE
CERTIFICATE OF CORRECTION

PATENT NO. : 6,836,281 B2
DATED : December 28, 2004
INVENTOR(S) : Kazumi Kumura

It is certified that error appears in the above-identified patent and that said Letters Patent is hereby corrected as shown below:

Title page,
Item [56], References Cited, OTHER PUBLICATIONS,
"Max Born" reference, "Propagation" should read -- Propagation, --.
Item [57], ABSTRACT,
Line 6, "depend" should read -- dependent --.

Column 3,
Line 14, "describes" should read -- described --.

Column 9,
Line 32, "$\lambda i$" should read -- $\theta i$ --.
Line 59, "satisfies" should read -- satisfy --.

Column 12,
Line 62, "is also" should read -- also --.

Column 13,
Line 45, "the all" should read -- all --.

Column 15,
Line 67, "reduces" should read -- reduced --.

Column 17,
Line 6, "the" should read -- to the --.
Line 46, "reduces" should read -- reduced --.

Signed and Sealed this

Twenty-eighth Day of June, 2005

JON W. DUDAS
*Director of the United States Patent and Trademark Office*